Jan. 24, 1967   J. C. YARASHES   3,299,565
ELECTRO-MAGNETIC TRANSPORT SYSTEM
Filed Aug. 6, 1963   4 Sheets-Sheet 1
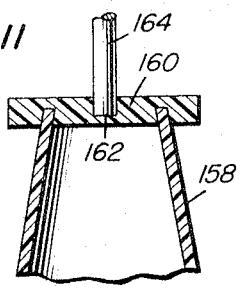
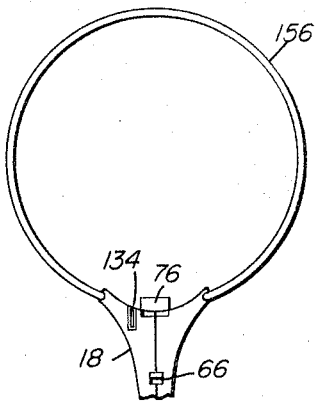
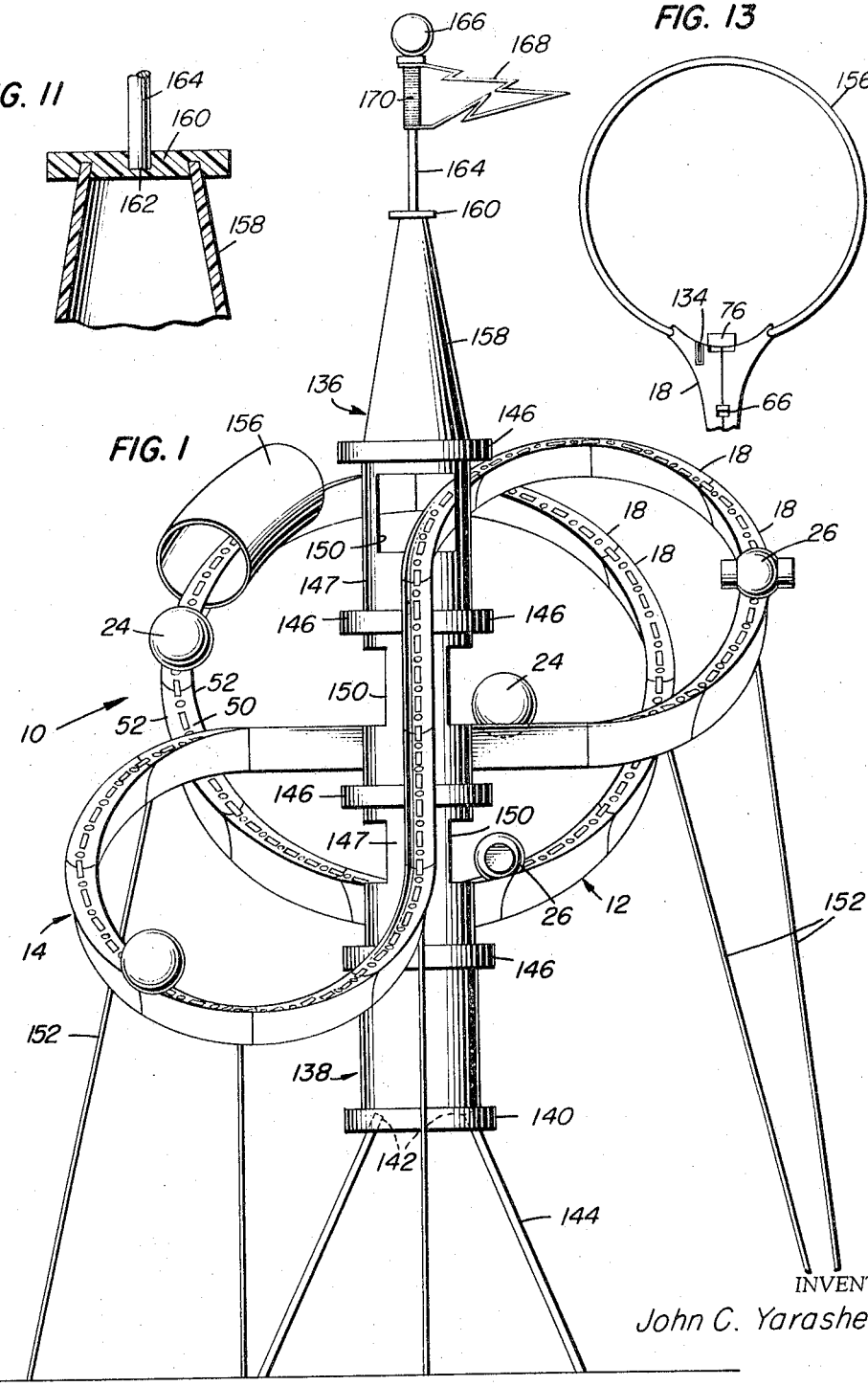
INVENTOR
John C. Yarashes
BY Gustave Miller
ATTORNEY

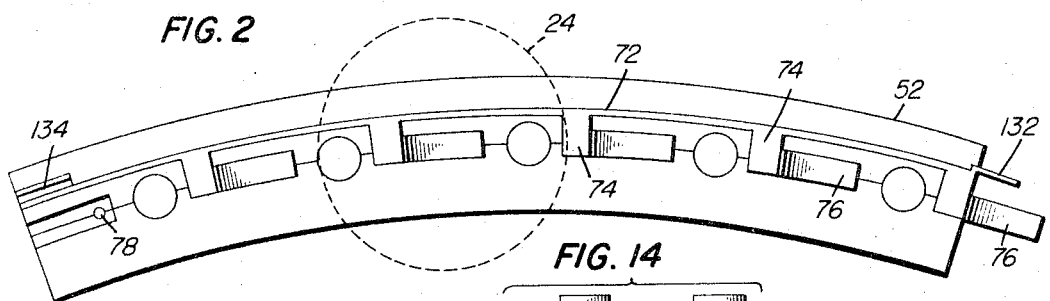
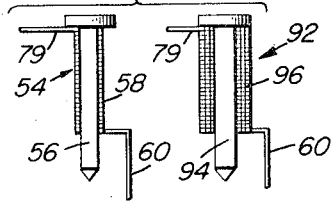
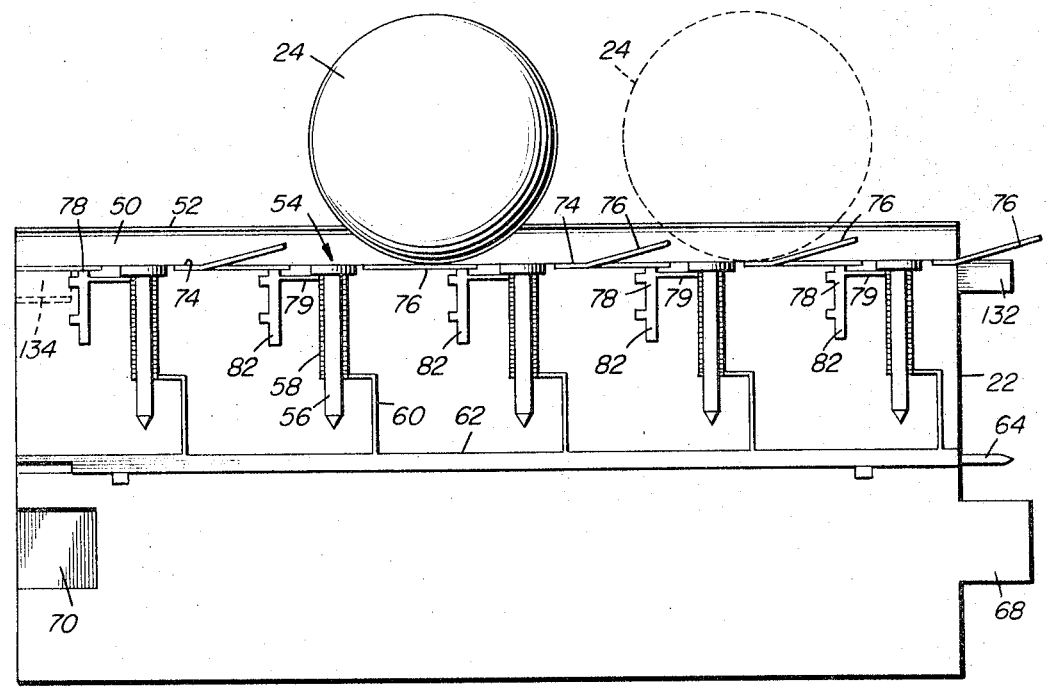
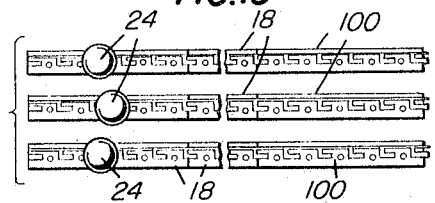

Jan. 24, 1967 J. C. YARASHES 3,299,565
ELECTRO-MAGNETIC TRANSPORT SYSTEM
Filed Aug. 6, 1963 4 Sheets-Sheet 3
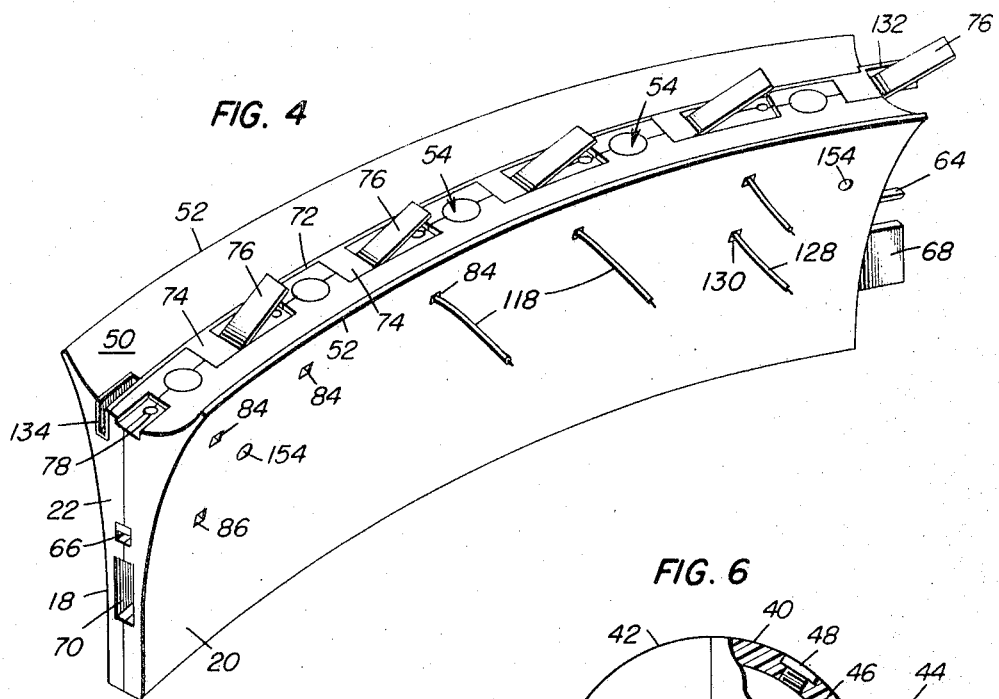
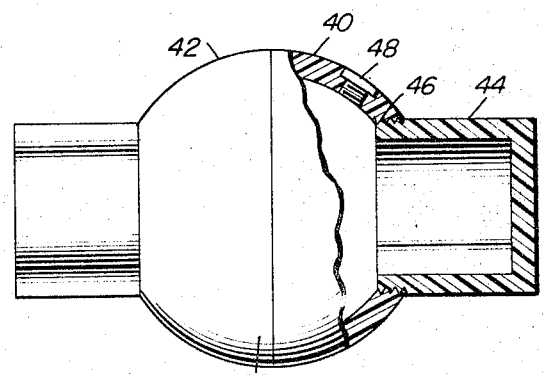
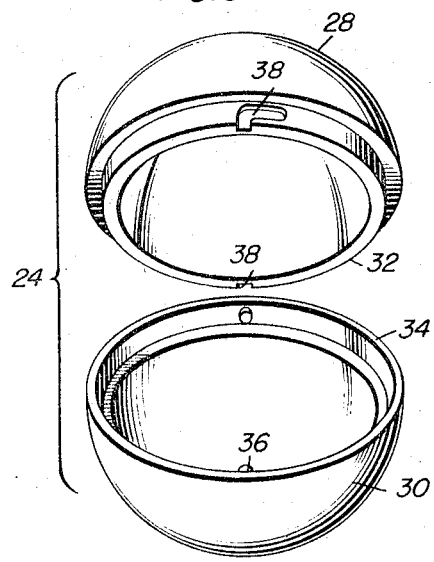
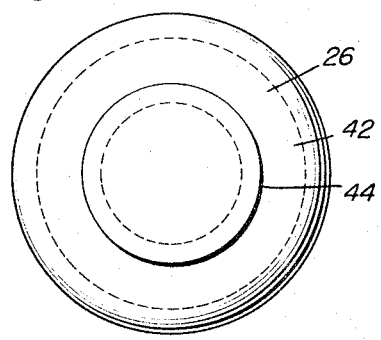
INVENTOR
John C. Yarashes
BY Gustave Miller
ATTORNEY Jan. 24, 1967 J. C. YARASHES 3,299,565
ELECTRO-MAGNETIC TRANSPORT SYSTEM
Filed Aug. 6, 1963 4 Sheets-Sheet 4
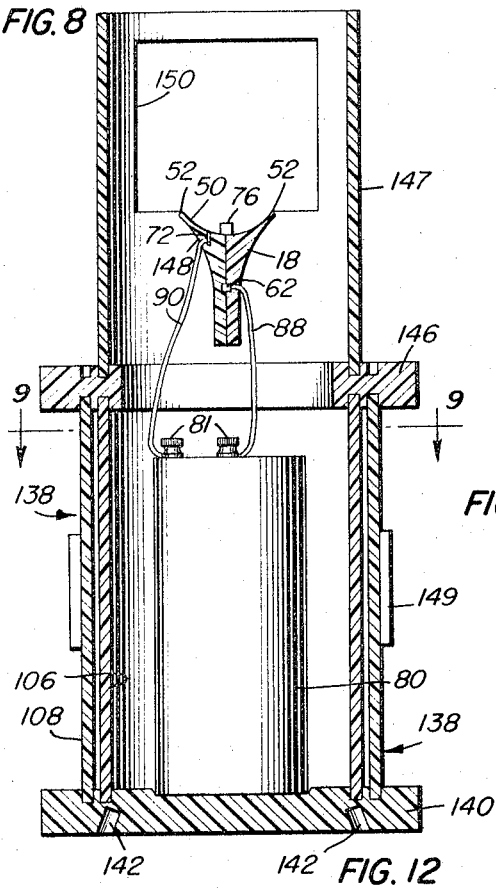
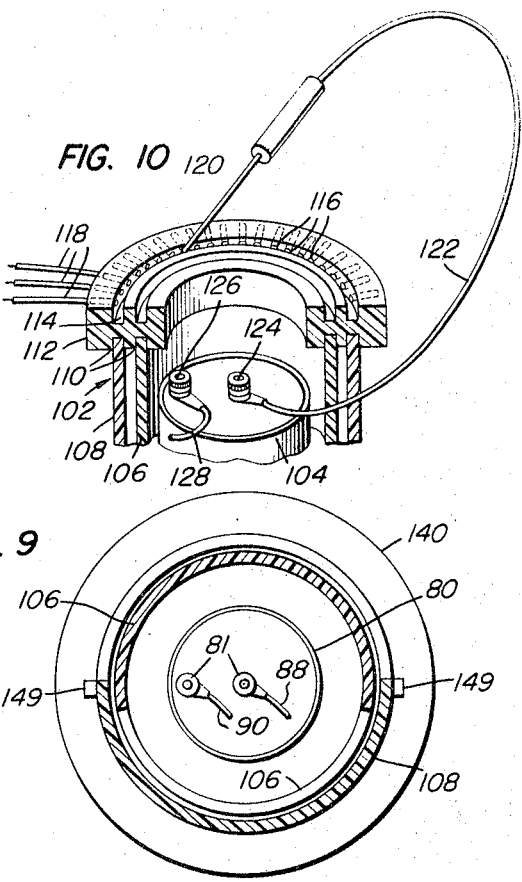
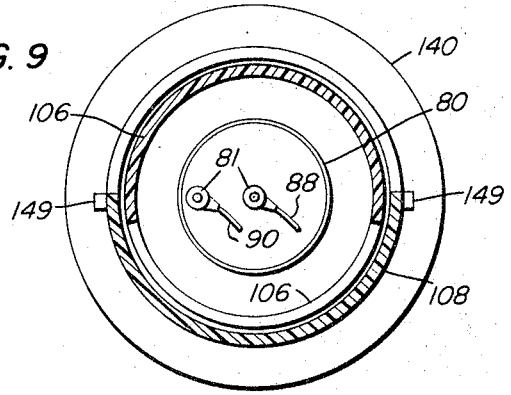
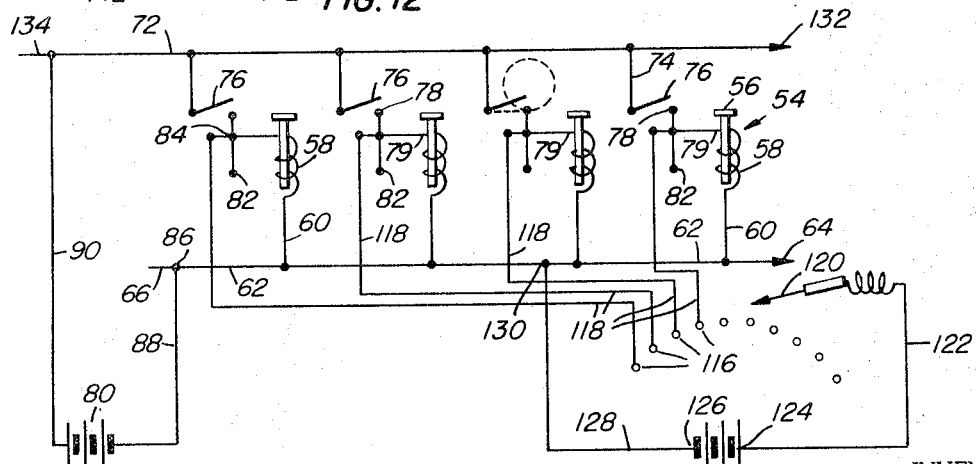
INVENTOR
John C. Yarashes
BY
ATTORNEY United States Patent Office 3,299,565
Patented Jan. 24, 1967

3,299,565
ELECTRO-MAGNETIC TRANSPORT SYSTEM
John C. Yarashes, 342 Bennett St.,
Luzerne, Pa. 18709
Filed Aug. 6, 1963, Ser. No. 300,313
11 Claims. (Cl. 46—235)

This invention relates to an electro-magnetic transport system.

A further object of this invention is to provide an electro-magnetic transport system capable of general transportation use, although here generally submitted as a toy, both for education purposes and for pleasure purposes, and in addition, for competitive purposes, is also submitted in the form of competitive race track for racing purposes by a plurality of persons.

A further object of this invention is to provide a transportation system the principles of which and construction of which can be developed to commercial use as a bona fide transportation system for the transport of payloads of materials, mails, liquids or granular materials, and passengers, such being possible by the enlargement or magnification of basic components, however modified, to include compensatory devices inherent in the adaption to larger equipment components and power supplies.

A further object of this invention is to provide an eelctro-magnetic transport system in which a vehicle is automatically moved at a maintained speed over a level section of track, with booster power provided on upgrades of the track and in addition, manually controllable means for increasing the power to certain track areas, as well as to stop and hold the moving vehicle at desired locations.

With the above and related objects in view, this invention consists in the details of construction and combination of parts as will be more fully understood from the following description, when read in conjunction with the accompanying drawings, in which:

FIG. 1 is a partly plan and partly elevational view of the transport system toy in operative position.

FIG. 2 is a top plan view of a track section.

FIG. 3 is an elevational view of one track half.

FIG. 4 shows both a regular power electromagnet and a high power electromagnet.

FIG. 5 is a perspective view of separated halves of one form of ball vehicle.

FIG. 6 is an elevational view, partly in section, of an alternate form of vehicle.

FIG. 7 is an end view of FIG. 6.

FIG. 8 is a sectional view of power station and track support.

FIG. 9 is a sectional view on line 9—9 of FIG. 8.

FIG. 10 is a perspective sectional fragmentary view of the top of power booster unit.

FIG. 11 is a sectional view of the tower steeple at the top of the toy.

FIG. 12 is a schematic view of the circuitry.

FIG. 13 shows a tunnel element mounted on the trackway.

FIG. 14 shows both a regular power electromagnet and a high power electromagnet.

FIG. 15 is an elevational view, on a reduced scale, of a plurality of tracks set up for a racing game.

There is shown at 10 the electro-magnetic transport system set up in the form of a pair of trackways 12 and 14, the one trackway 12 being in the form of a circle, the other trackway 14 being in the form of a figure eight, and both mounted on and supported in a station tower 136, the outlying sections being supported by supporting rods 152.

Each trackway, 12 and 14, is made up of a plurality of individual track sections 18, in conformance with the individual showing in FIGS. 2, 3, and 4, and each track section 18 is made up of two complementary track halves 20 and 22. Further, as apparent from FIG. 1, different individual track sections 18 may be provided with different degrees of horizontal curvature, as in the trackway 12, or grade, or both, as in trackway 14, the maximum vertical grade being preferably not over five degrees, the showing in FIG. 1 being somewhat distorted for purpose of illustration.

The track section 18 is somewhat Y-shaped in cross section, except that the outside legs of the Y are in a smooth curve, and the upper arms of the Y, instead of being at an angle, are curved in cross section in a concavity slightly less than complementary to spherical shape of the ball vehicles 24, 26 shown in FIGS. 5, 6 and 7.

As shown in FIG. 5, the ball vehicle 24 is in the form of a sphere or ball made up of two separate but readily attachable halves 28 and 30, here shown as being provided with interfitting flanges 32 and 34 and complementing bayonet pin 36 and bayonet slot 38, although threads or other equivalent securing means may be used.

In FIGS. 6 and 7, the vehicle 26 is likewise made of ball halves 40 and 42, similarly secured together, but having cylindrical portions 44, closed at one end and threaded at their other ends 46 in the ends of the ball halves 40 and 42. In addition, one ball half is provided with a threaded aperture for receiving a threaded plug 48 therein. Thus, both forms of vehicle can carry a payload. The vehicles are of course made of magnetically attractable material, such as tin plated iron, iron or sheet steel formed into proper shape, and when in the form of a toy, the diameter can vary up to two inches, and are effective in carrying a payload of one and one half ounces up a continuous grade or incline of five degrees. In the vehicle 26, elongate objects may be inserted by temporarily unthreading one end cylinder 44, while liquid or granular material may be inserted through the threaded aperture, which is thereafter sealed by the plug 48.

The track halves 20 and 22 are constructed of a suitably molded plastic insulating material suitably recessed, as will become apparent, to receive and support the electrical components therein. Obviously, wood, or other insulating materials may be used. The channel 50, in the top of the track sections 18 separates the two ridges providing tracks 52 on which the balls 24 and 26 ride with a minimum of surface contact, so as to keep friction to a minimum, the weight of the balls being entirely on the tracks 52. The distance between the ridges, in the toy system, is three fourths of an inch, and the arc is formed of very slightly less than one inch in diameter, so that the balls will not touch the channel surface except at the tracks 52.

The electrical and magnetic components of this invention are embedded in or countersunk in the track sections 18, either in complementary recesses in both track halves 20 or 22, or in the surface of one track half. A plurality of electromagnets 54 are located in spaced apart relation along the channel 50 in the track sections 18, and each electromagnet 54 consists of a core 56 surrounded by a coil 58, each coil 58 being connected by a line 60 to a common busbar 62 extending through complementary recesses between the walls of adjacent track halves 20 and 22. One end 64 of busbar 62 extends in a male projection beyond the end of the track section 18, while the other end 66 is provided with a female recess, so that when two track sections 18 are mated together, a male track projection 68 at one end is received in a complementary female recess 70 of an adjacent track section, while the busbar male projection 64 enters female recess 66 thus holding the track sections 18 in end to end relation, both mechanically and electrically.

A second busbar 72 is countersunk in the channel surface of track half 22, and likewise is provided with a male extension 132 at one end and a complementary female recess 134 at the other end, so that both busbars 62 and 72 are both electrically and mechanically joined together in making up the electrical circuit when the track sections 18 are joined. A plurality of tongues 74 extend at right angles from the busbar 72 in recesses in the channel 50, and extending forwardly, in the direction of travel of the balls 24 and 26, are resilient switches 76, normally extending upwardly, but flexible enough to be temporarily depressed by the weight of a ball 24 or 26 so as to complete a circuit to a contact 78 below it. Each contact 78, shaped as shown in FIG. 3 so as to be easily retained in position, is connected by a line 79 from the adjacent coil 58. The electrical conductors, the busbars 62 and 72 and switches 76 are of non-magnetic resilient conductive material, and are connected to the opposite poles 81 of a direct current battery 80. As a ball 24 or 26 rolls over a switch 76, it causes the electromagnet 54 to establish a magnetic field to attract the ball, and when the ball passes the switch 76, the magnetic field collapses, permitting the balls to continue on to depress the next switch 76 and thus be pulled on continuously. As will be noted in FIG. 3, each contact has a depending contact tail 82, and a plug aperture 84, seen in FIG. 4, extends through the outside wall of each track half 20 to this contact tail 82. Another plug aperture 86 extends through the outside wall of track half 20 to connect line 88 between busbar 62 and battery 80 on one side while a similar plug aperture, not visible and appropriately located in the outside wall of the other track half 22, permits line 90 to connect busbar 72 to battery 80.

Where no grade or incline is present, the electromagnets 54 are as shown in FIG. 3 and at 54 in FIG. 14. However, when extra power is needed, for automatic operation, heavier electromagnets 92 are provided, as when the track is at an incline, up to a grade of five degrees, with heavier cores 94, larger size coil wire, and a larger number of turns in the coils 96. In automatic operation, each ball 24 or 26, as it rolls along the tracks 52 over channel 50 depresses each switch and releases it successively, thus successively creating and collapsing successive magnetic fields to move the ball 24 or 26 along the tracks 52.

To provide manual control for balls 24 or 26, either for speeding up the travel or for stopping their travel, either on the circular trackway 12 and the figure eight trackway 14, or on the parallel trackways 100, set up in parallelism as illustrated in FIG. 15 and usable for competitive racing games, a booster power station 102 is provided as in FIG. 10, with a booster battery 104. The booster power station 102 includes a semicylindrical wall 106 and a semicylindrical door 108 concentric therewith which extend into channels 110 on the bottom of an annular disc 112, the wall, door and disc being of insulating material. A disc similar to disc 140, provides a floor for station 102. Extending through the disc 112 into a top circular channel 114 are a plurality of contacts 116, which may be hollow to receive plugs on the ends of conductor lines 118. The other ends of the lines 118 have plugs which may be inserted into selected apertures 84 in trackway half 20 to the individual contact tails 82.

A manually operable probe 120 at the end of line 122 connected to one pole 124 of booster battery 104 may be moved along channel 114 to thus successively or selectively connect the battery pole 124 to successive or selected contact tails 82 and thus to the electromagnets 54 or 92, bypassing the switches 76. The other battery pole 126 is connected by conductor line 128 through another plug aperture 130 in the side wall of track half 20 to busbar 62. Obviously, the conductor lines 118 may be connected to as many or as few of the contact tails 82 through the apertures 84 as desired, thus necessitating varying degrees of manual skill and dexterity, particularly in competitive racing. The busbar 72 also has a male projection 132 at one end, and a female recess 134 at the other end, so that, when track sections 18 are joined together by their tongues 68 and recesses 70 both busbars 62 and 72 are mechanically and electrically joined together to provide continuity of the circuit.

When the manual probe 120 is operated, it may be used to supplement the power of the regular battery 80 with that of the booster battery 104 to speed up the travel of the balls 24 or 26 when the probe 120 is moved along the channel 114 at the proper rate. However, if stopped at a particular contact 116, it will maintain a magnetic field at the particular connected electromagnet and thus stop the travel of the ball and hold it there. The same result will take place if it is inadvertently held at a contact 116 too long when the ball has passed the switch 76 to that contact, thus slowing down the travel of the ball, which of course makes for competitive skill in a racing game set up either between the two trackways 12 and 14, or between the parallel trackways 100.

The parallel trackways 100 may be laid out on any flat surface, as shown in FIG. 15, but one or more towers 136 shown in FIGS. 1 and 11, may be provided for the trackways 12 and 14. The tower 136 includes a battery station 138 for the battery 80, the station 138 consisting of a bottom disc 140 having angular holes 142 in the bottom to receive supporting legs 144. A semicircular wall 106 and semicircular door 108, the same as in booster power station 102, supported in channels in the bottom disc 140 serve to support an upper annular disc 146, the handles 149 being shown on the door 108. The holes in annular discs 112 and 146 permit the power line to extend therethrough. The upper disc 146 has similar channels on its upper surface, in one of which is received a cylindrical stanchion 147 having openings 148 in opposite sides thereof complementary to the track sections 18, and also openings 150 through which the balls 24 or 26 may pass freely on the tracks 52. Obviously, any desired number of discs 146 and stanchions 147 may be used to build the towers 136 to the desired height, and two or more towers may be provided according to the shape of the trackways 12 and 14 to be supported therein. Supporting rods 152 of appropriate length may also be used, inserted into holes 154 provided in the track sections, to provide additional support wherever needed. One or more tunnel elements 156 may be provided as desired, to be clamped over the trackway as desired. This tunnel element may be constructed of plastic or sheet metal or pressed paper, the edges being bossed or curled for grip accordingly as shown to facilitate placement or removal.

A steeple stanchion 158 supported in the topmost disc 146 in turn supports a small roof disc 160, which in turn has a center hole 162 for supporting a flag staff 164. Mounted on the top of the flap staff 164 is a ball 166, and a banner 168 symbolizing a charge of electricity connected to the staff 164 by coil 170, symbolizing an electromagnet.

Thus, the entire transport system is made up of separate components and units which may be readily assembled and disassembled as desired into differently appearing systems according to either the whim or the necessity of the constructor.

The operation should be obvious from the foregoing description. The balls 24 and 26 may carry varying loads as desired. A tower transportation system may be assembled as desired, using track sections 18 of appropriate curvature and grade, or a racing game may be set up with the tracks 18 in parallelism as at 100 in FIG. 15. As many regular power stations 138 may be connected as desired, and booster power stations 102 may be connected to desired electromagnets to thus provide manual control as desired.

While this system is submitted as a toy, the principles embodying this operation and construction can be developed and adapted to commercial use as a bona fide transportation system for the transport of payloads of materials, mails, liquids and passengers. This can be possible by the enlargement or magnification of the basic components, however modified to include compensatory devices inherent in the adaptation to larger equipment components and power supplies. For example, in place of the simple mechanical switching arrangement shown here, a photo-electric switching system would be substituted, giving additional advantages of decreased friction resistance as well as providing more precise make and break switch timing. This enlargement may be made possible providing the expense or justification for safety factors for mail, property and passengers would make it generally desirable.

The widespread acceptance and use of this toy can provide instructiveness, provoke thought, and inducement to consider this a new concept of transportation. Coupled with the development of nuclear reactors and the desire to adapt them to supply electrical power to cities, this system could encourage the development of reactors by providing an additional market for the use of electric power.

This system may further provide a means of transportation where, in view of our present public objectives of attempting lunar and planetary landings, gravitational strength may be found low enough to increase the effectiveness and desirable transportation system.

The advantage of elimination of transporting conventional fuel supplies would be achieved by this system. Once a track is transported and assembled, solar batteries and/or storage capacitors could provide a self-energizing self-sustaining means of transport without the need for continous re-supply of bulky, expansive and explosive fuels. This system may be put to use where atmospheric conditions would make the use of explosive or combustible fuels dangerous or impossible.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. In an electro-magnetic transport system, the combination of a pair of tracks, a magnetic material vehicle rollable thereon, a concave channel between said tracks, said vehicle having a rolling surface substantially complementary to said channel, a plurality of direct-current electro-magnetic coils spaced apart along said channel and connected to a circuit of direct current, a readily depressible circuit-completing switch for each coil extending normally upwardly through the bottom of said channel in circuit-interrupting position ahead of the coil it controls, said vehicle in rolling over said tracks also rolling over said switch to depress said switch to coil energizing position to cause said coil to accelerate said vehicle toward said energized coil, said vehicle rolling beyond said switch as said vehicle approaches said coil permitting said switch to return to circuit interrupting position to deactivate said coil and permit said vehicle to coast over said deactivated coil to activate the next successive switch to energize the next successive coil, a booster circuit of direct current connected to a plurality of said spaced apart coils through a manually controllable booster circuit completing means whereby to manually complete a coil energizing booster circuit to a selected coil to further accelerate the approach of said vehicle to said selected coil, or to stop and hold said vehicle at said vehicle at said selected coil, said booster circuit completing means comprising a plurality of circuit contacts, one for each coil, mounted in spaced apart relation in a common channel, and a manually controllable circuit completing probe movable along said common channel to successively complete the booster circuit to successive coils and further accelerate said vehicle as it approaches said successive coils, or stop said vehicle at a particular coil if the circuit thereto is maintained when said vehicle reaches said particular coil.

2. In an electro-magnetic transport system, the combination of a pair of tracks, a magnetic material vehicle rollable thereon, a concave channel between said tracks, said vehicle having a rolling surface substantially complementary to said channel, a plurality of direct-current electro-magnetic coils spaced apart along said channel and connected to a circuit of direct current, a readily depressible circuit-completing switch for each coil extending normally upwardly through the bottom of said channel in circuit-interrupting position ahead of the coil it controls, said vehicle in rolling over said tracks also rolling over said switch to depress said switch to coil energizing position to cause said coil to accelerate said vehicle toward said energized coil, said vehicle rolling beyond said switch as said vehicle approaches said coil permitting said switch to return to circuit interrupting position to deactivate said coil and permit said vehicle to coast over said deactivated coil to activate the next successive switch to energize the next successive coil, a power station and track support comprising a disc having a pair of concentric grooves therein, a second disc having a similar pair of concentric grooves therein, a partly cylindrical wall secured in a groove of each disc supporting said second disc above said first disc, a partly cylindrical door slidable in the other grooves of said discs thereby providing a closable housing, a power battery enclosed in said housing, a cylindrical stanchion secured and supported in a groove on the top of said second disc, said cylindrical stanchion having openings through opposite sides complementary to said tracks for supporting said tracks through said cylindrical stanchion, and vehicle passage openings above said track openings, and power lines extending from said power battery through an opening in said second disc to said track supported thereabove.

3. The electric transport system of claim 1, said tracks comprising a plurality of attachable track sections, some of the coils in some upgrade track sections being larger than other coils, thereby providing greater power.

4. The electric transport system of claim 3, said larger coils having a greater number of coils of wire than in the smaller coils, larger size coil wire, and a core of greater size than in the smaller coils.

5. In an electric transport system, a track comprising a plurality of track sections, each track section comprising a pair of complementary track halves secured together along a complementary vertical face, said track sections being somewhat Y-shaped in cross section but having the upper portion between the arms of the Y concave in cross section and providing a track channel, a plurality of direct-current electro-magnetic coils having cores held in spaced apart relationship in the bottom of said channel, a busbar mounted in said track section in said vertical face between said section halves below said coils and connected to each said coil and thence to a contact member in said channel, a second busbar countersunk in said track channel to one side of said spaced apart coil cores, a tongue extending from said second busbar transversely to the center of said track channel, and a readily yieldable switch member integrally extending normally upwardly from said busbar tongue and overlying said coil contact member in said channel, each said track section and each said busbars therein having female recesses at one end and male projections at its opposite end for mechanically and electrically connecting said sections in a rollable vehicle carrying track, in combination with a rollable vehicle complementary to said track channel for successively depressing said switch members to circuit closing positions as it passes thereover.

6. In the electric transport system of claim 5, each track section having a booster circuit contact receiving aperture through one half thereof to each said contact member in said channel and a booster circuit receiving contact to said second busbar.

7. The transport system of claim 2, said tracks being provided by a plurality of separable track sections each having mateable male and female portions, at least some of said track sections having supporting rod receiving recesses therein, and supporting rods inserted in said recesses of some of said track sections to support some track sections not directly supported by said cylindrical stanchions.

8. The transport system of claim 7, said power station and said cylindrical stanchion providing a tower, and a steeple stanchion on said tower.

9. The transport system of claim 8, and a cylindrical tunnel element clamped over a track section.

10. A toy electric transport system comprising a plurality of separable track sections each having mateable male and female mechanical and electric conductor portions in combination with a power station tower for supporting at least one track section and for supporting an electric battery, said tower comprising a cylindrical battery housing, a cylindrical stanchion supported on said battery housing, said cylindrical stanchion having openings through opposite sides thereof complementary to a track section for supporting said track section therethrough, a vehicle rollable over said track sections, electrically operable means in said track sections connected to said electric battery for controlling said vehicle on said track sections, others of said track sections not supported by said stanchion having supporting rod receiving recesses therein, and supporting rods in said recesses for supporting such track sections.

11. The toy electric transport system of claim 10, said tower battery housing also having supporting rod receiving recesses therein and supporting rods in said latter recesses.

References Cited by the Examiner

UNITED STATES PATENTS

| | | | |
|---|---|---|---|
| 1,520,345 | 12/1924 | Hamilton | 273—86 |
| 1,616,280 | 2/1927 | Prins | 273—86 |
| 1,648,956 | 12/1927 | Meade | 273—86 X |
| 1,885,662 | 11/1932 | Whitehorn. | |
| 2,000,808 | 5/1935 | Williams | 46—43 |
| 2,218,164 | 10/1940 | Carpenter | 124—3 X |
| 2,746,206 | 5/1956 | Hammond | 46—235 X |

DELBERT B. LOWE, *Primary Examiner.*

ANTON O. OECHSLE, M. R. PAGE,
*Assistant Examiners.*